United States Patent [19]

Rialan et al.

[11] Patent Number: 5,351,244
[45] Date of Patent: Sep. 27, 1994

[54] SEISMIC TRANSMISSION METHOD AND DEVICE FOR A VERY LOW ERROR RATE

[75] Inventors: Joseph Rialan, Meudon; Christian Grouffal, Rueil-Malmaison, both of France

[73] Assignee: Institut Francais du Petrole, Malmaison Cedex, France

[21] Appl. No.: 162,384

[22] Filed: Dec. 7, 1993

Related U.S. Application Data

[63] Continuation of Ser. No. 839,999, Feb. 24, 1992, abandoned.

[30] Foreign Application Priority Data

Feb. 22, 1991 [FR] France .................. 91 02243

[51] Int. Cl.$^5$ .................. G06F 11/00; G06F 11/10; H03M 13/00
[52] U.S. Cl. .................. 371/2.1; 371/37.7
[58] Field of Search .................. 371/2.1, 37.4, 37.5, 371/37.7, 38.1, 39.1; 364/737

[56] References Cited

U.S. PATENT DOCUMENTS

| Re. 33,900 | 4/1992 | Howson | 371/37.7 |
|---|---|---|---|
| 4,712,199 | 12/1987 | Rialan et al. | 367/76 |
| 4,901,319 | 2/1990 | Ross | 371/2.1 |
| 4,965,576 | 10/1990 | Watanabe et al. | 371/37.7 |
| 5,022,029 | 6/1991 | Guichon | 371/2.1 |
| 5,070,503 | 12/1991 | Shikakura | 371/2.1 |
| 5,109,385 | 4/1992 | Karp et al. | 371/39.1 |

FOREIGN PATENT DOCUMENTS

0325839  8/1989  European Pat. Off. .
2149276  6/1985  United Kingdom .

OTHER PUBLICATIONS

International Conference on Video and Data Recording, Southampton Hampshire, 24–27 Jul. 1979, supplement IERE conference Proceedings No. 43; M. R. De Haan et al.: "A system concept for optical data recording" *p. 5, lines 12–43; FIG. 5*.

Primary Examiner—Robert W. Beausoliel, Jr.
Assistant Examiner—Trinh Tu
Attorney, Agent, or Firm—Antonelli, Terry, Stout & Kraus

[57] ABSTRACT

A method and an apparatus are applied to the seismic data received by receivers (Ri) distributed in the field and collected by acquisition boxes (Bi), in order to be transmitted to a central control and recording station (P), for example through hertzian channels. Digital words by adding to each N1-bit digitized signal sample, in each acquisition box, a n-bit coding suffix sufficient for detecting and correcting any transmission-related error. In order to eliminate the effect of long interferences, the method also comprises arranging the words in blocks, interleaving the words of each block at the time of the transmission, and forming digital symbols. A complementary sequence for reverse interlacing, deblocking and correcting possible errors brings the digital samples back to the original state thereof.

7 Claims, 3 Drawing Sheets

SEISMIC TRANSMISSION METHOD AND DEVICE FOR A VERY LOW ERROR RATE

This application is a continuation of U.S. patent application Ser. No. 07/839,999, filed Feb. 24, 1992, now abandoned.

BACKGROUND OF THE INVENTION

The present invention relates to a method and a device for transmitting seismic data with a very low error rate.

Modern seismic prospecting methods require transmitting considerable volumes of data. The methods are implemented by arranging in the explored zone numerous data acquisition apparatuses distributed at regular intervals over distances which often amount to several kilometers. Each acquisition apparatus is adapted for collecting seismic signals picked up by one or several appropriate receivers (hydrophones or geophones) in response to vibrations transmitted in the subsoil to be explored by a seismic source and which are reflected by the subsoil discontinuities. The signals the acquisition apparatus collect are sampled, digitized and stored in a memory before being transmitted in real time or in batch mode to a central control and recording station. Transmitting the data between the different acquisition apparatuses and the central station is performed through hertzian channels. Various radio or cable transmission systems are described for example in U.S. Pat. Nos. 4,583,206; 4,979,152; 4,815,044 and in the French patent application FR No. 2,652,162.

For transmitting through hertzian channels, a carrier signal whose phase is modulated in relation to the signal to be transmitted according to the particular mode of transmission of a well-known-type is used: FSK, MSK, PDSK, etc.

The modulating signals are bit streams with sudden variations of amplitude at the successive times of transition between the bits. The main effect of these discontinuities is a notable broadening of the pass-band necessary for each transmission. This is a major drawback, notably because of the restrictions which are often imposed by the regulations applying to telecommunications.

A modulation method, notably known through the article: "Tamed Frequency Modulation, A novel method to achieve spectrum economy in digital transmission" in IEEE Transaction vol. com-26N° 5, May 1978, aims at softening the previous phase transitions and thereby at reducing the pass-band necessary to the transmission of digitized data. This method mainly consists in applying to the carrier wave a phase variation which depends not only on the bit to be transmitted but also on the previous bit and the following bit, with an appropriate weighting. The phase of the carrier therefore undergoes lesser variations, which results in a narrower emission spectrum. Instead of transmitting successive bits, symbols combining three successive bits are transmitted. The achieved combination is a shifting combination since each one of the successive bits to be transmitted is combined with the two adjoining bits.

In spite of the advantage of a narrower pass-band such as provided by this type of modulation known as TFM, it is well-known that it also leads to a certain modification in the distribution of the errors which are then grouped in bursts.

The errors which arise in the transmissions may have very different causes: fading, switching interferences, interchannel crosstalk in the multipath transmission systems, etc. Because of the bit coordinations resulting within the context of a modulation of the TFM type, any possible transmission incident randomly affects one or several ones of the transmitted symbols, and the possible errors are transferred at the time of the decoding to all the bits constituting each one of them.

Numerous methods for coding the data to be transmitted and making it possible to detect and correct possible errors at the reception thereof are well-known. These methods comprise using a block coding process and changing any bit sequence to be transmitted into successive words comprising a group of check bits depending on the selected code: Hamming codes, cyclic codes, codes known as BCH codes, Reed-Salomon codes, Golay codes, etc. Other methods utilize codings of the type known as convolutional where the encoding of the data bits in each block depends on a certain number of previous blocks.

Notably within the framework of the transmission of seismic data, it is particularly useful to detect and correct errors properly. U.S. Pat. No. 4,712,199 for example describes a transmission method in which the series of words to be transmitted is divided into blocks of words containing the same number of signal samples, each one being fitted with synchronizing and identifying signals. By checking these accompanying signals and the number of words in the different blocks, it is easier to locate the instants at which transmission errors occurred and to restore seismic sections in which the seismic events are set in the proper place thereof.

Although this type of checking makes it possible to detect certain errors, the fact remains that it is necessary to reduce the rate of transmission errors to extremely low values and also to reduce the effect of any interference occurring at random on the form of the signal reconstituted after reception or, in some cases, on the form of the signal after certain conventional processing operations. It is for example known that any correlation between a received seismic signal and a transmitted signal, an operation which usually occurs when a vibrator is used as a seismic source, has the effect of amplifying an isolated error on a received signal sample by transferring it to the total correlated trace.

SUMMARY OF THE INVENTION

The object of the present invention is to provide a method for transmitting seismic data with a reduced pass-band and a very low transmission error rate.

The transmission method according to the invention relates to the transmission of digitized seismic signals between data acquisition apparatuses in acquisition boxes distributed in an exploration zone, adapted for collecting each one of the seismic signals picked up by one or several appropriate receivers in response to seismic signals transmitted in the subsoil by a seismic source, in the form of digitized samples and for storing them, and a central control and recording station.

It comprises:

a) forming in each acquisition device digital words, each word constituted by adding a group of n check bits to each digitized signal sample of N1 bit to be transmitted;

b) sequencially storing the different words in successive blocks of N2 words, c) for each one of said blocks, sequentially reading by interleaving words of N2 bits successively obtained by grouping together all the bits of equal rank, this being performed successively for each rank, d) forming digital symbols by combining, with appropriate weightings, several successive bits from the bit stream obtained through said reading, e) modulating the phase of a carrier signal by the successive digital symbols, the method also comprising in said central control and recording station:

f) detecting said digitized symbols in the carrier signal and decoding them, g) reconstituting the blocks of digital words by reverse interleaving of the digital words of each received block on a storage support adapted for containing at least the N2 words of a single block, and h) correcting possible errors affecting each one of the reconstituted digital words, by decoding the associated n check bits before suppressing them.

With the method according to the invention, two objectives can be combined:

transmitting high throughputs of seismic data according to a coded transmission mode with a limited passband which fulfills more easily the strict regulations on radio transmission which are generally imposed in many countries, and detecting and correcting practically all the errors which may occur during the transmissions in a seismic transmission system and particularly the errors inherent in the utilized method of modulation through digital symbols. This makes it possible to achieve high-quality seismic recordings, whatever the transmission conditions prevailing in the utilized zone may be.

The method according to the invention can also comprise adding to the digital words to be transmitted additional check data in each one of the acquisition boxes and detecting then in the central station, this addition comprising for example combining synchronizing data and identifying and locating data makes it possible to measure with precision the phase variations of the carrier signal.

Forming digital symbols is advantageously achieved with a coding of the TFM type for example.

It is for example possible to form digital words by adding a group of 5 check bits to each 24-bit signal sample and to store the data to be transmitted in the form of blocks of 16 words.

The device for implementing the method comprises acquisition apparatuses, each one comprising:

a) a first coding assembly comprising means for forming words by adding a group of n coding bits to each digitized sample of N1 bits, b) a first storing means for storing blocks of N2 words each with the group of coding bits thereof, c) a first management means achieving the storing of the digital words in the first storage means and the sequential reading thereof by interleaving in order to form words of N2 bits each;

d) a second assembly for coding the transmission comprising means for forming digital symbols by combining with appropriate weightings several successive bits of each train of bits extracted from the first storage means;

e) a transmitter adapted for transmitting the digital words from the second coding assembly onto a transmission channel connecting each acquisition apparatus to the central control and recording station;

the device also comprises in said central station:

f) a receiver adapted to said transmission channel;

g) a first decoding assembly comprising means for restoring the interleaving digital words from the digitized symbols;

h) a second storage means adapted for containing at least the digitized N2 words of a block;

i) a second management means achieving the ordering of the digital words in the second storage means and the reverse interleaving thereof; and j) a second decoding assembly for dissociating the transmitted data from the respective coding groups thereof and for correcting from these groups the errors affecting said data.

Each acquisition apparatus comprises for example means for combining synchronizing words with said series of digital words, and the central station comprises correlating means for detecting the synchronizing words.

The second coding assembly can comprise means for combining digital words that will lead to phase variations of determined values (zero and $\pm \pi/4$ for example), and the decoding assembly comprises calibration means for calibrating the means for restoring the digital words from the digitized symbols of these combined digital words.

BRIEF DESCRIPTION OF THE DRAWINGS

Other features and advantages of the method and the device according to the invention will be clear from reading the description hereafter of an embodiment given by way of non limitative example, with reference to the accompanying drawings in which.

DESCRIPTION OF THE PREFERRED EMBODIMENTS

Figure 1:
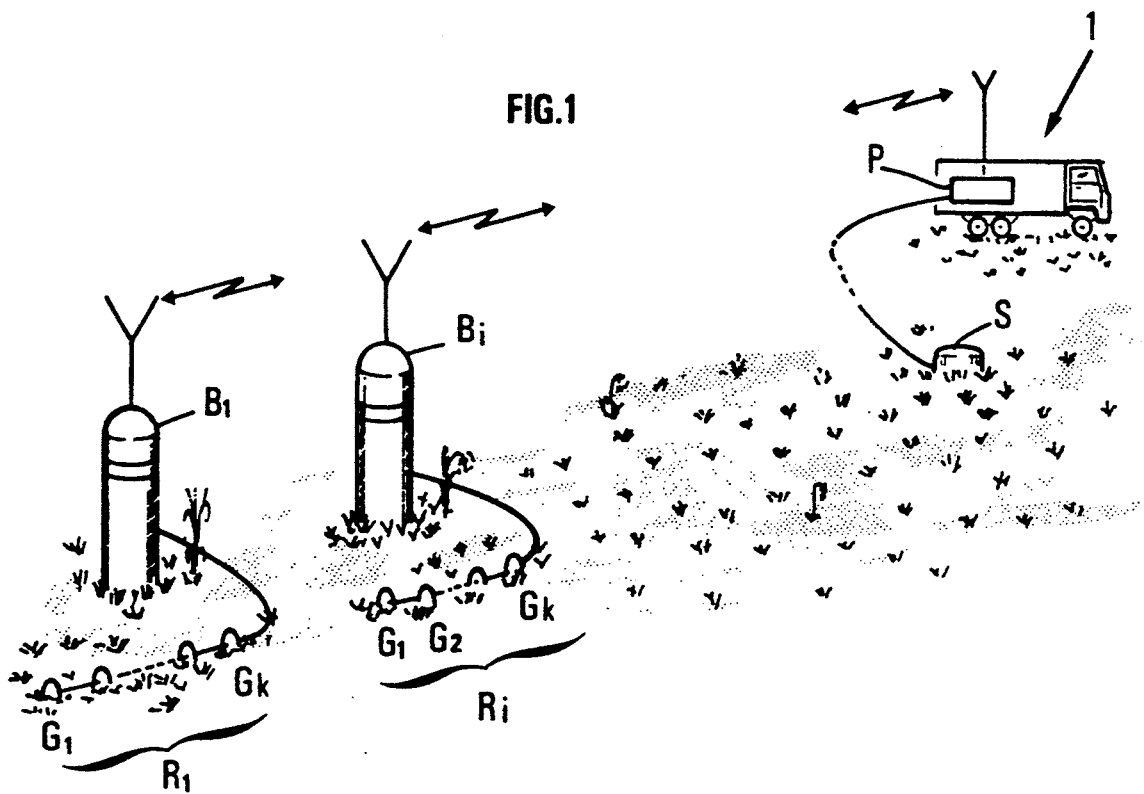
FIG. 1 shows a seismic acquisition and transmission system installed in an exploration zone.

The system according to the invention is adapted (FIG. 1) for setting up coded communications between an assembly of acquisition apparatuses or boxes B1 ... Bi, and a central control and recording station installed in a truck 1. Each apparatus is adapted for collecting seismic signals picked up by one or possibly several seismic receivers R1 ... Ri, connected to the ground, these signals corresponding to the echoes on subsurface reflectors of vibrations imparted in the ground by a seismic source S of any type, such as a vibrator. Apparatuses Bi digitize the picked up signals and record them. At the end of each transmission-reception cycle for example, the acquisition apparatuses controlled in sequence by the central station transmit the data they have stored to the station. They are preferably placed in tight buoys when the operations are performed in wet zones (lakes, marshes, forests, etc). An acquisition system can comprise several hundred apparatuses Bi, combined with receivers, several ten meters away from one another.

Figure 2:
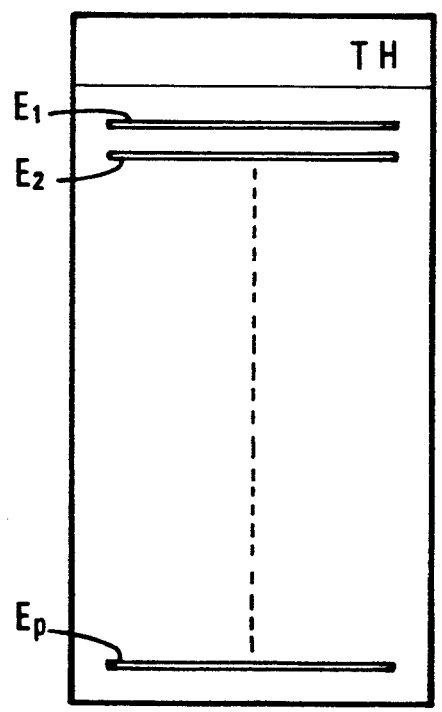
FIG. 2 shows in the form of a table a set of digitized samples constituting a signal or trace to be transmitted.
Figure 3:
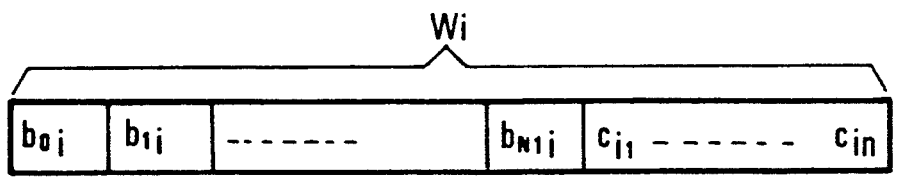
FIG. 3 shows a digital word consisting of a digitized sample provided with a n-bit coding suffix.

The device according to the invention is adapted for transmitting towards the central station the signals stored by each apparatus which constitute a seismic trace and come (FIG. 2) in the form of a series E1 to Ep of digitized samples. Each series is generated in each box Bi by an acquisition apparatus Ai (FIG. 6) from the signals picked up by the one or several receivers Ri, and the series is stored in an internal memory MO. In this memory, addresses in which a certain number m of synchronizing words of N1 bits each, with a well-defined structure, will be loaded are reserved.

Figure 4:
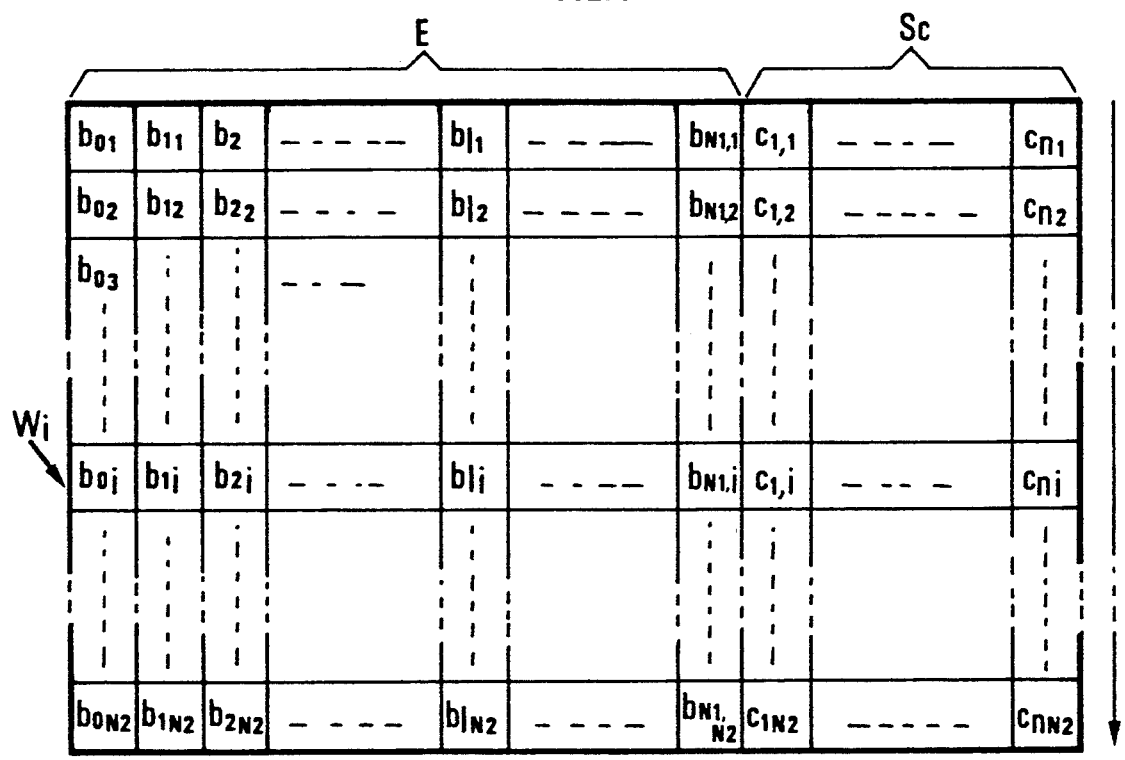
FIG. 4 diagrammatically shows a storing means in each acquisition apparatus, in the form of a table of N2 words for a block of digital words.
Figure 6:
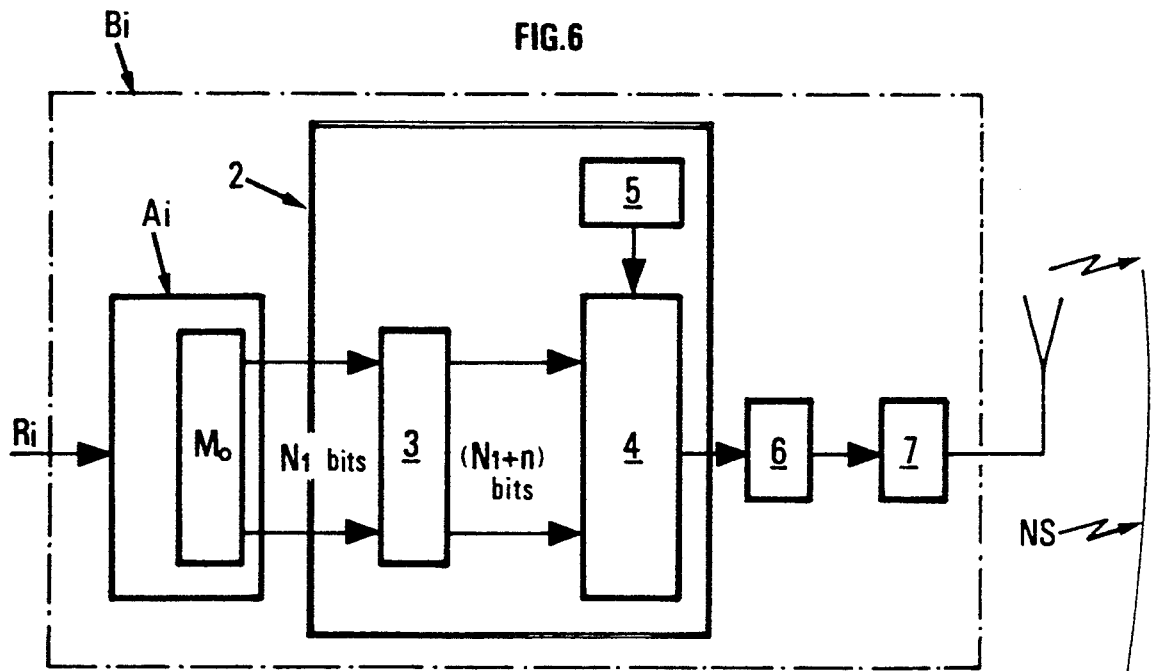
FIG. 6 is a block diagram of an embodiment of the implementing device included in each acquisition apparatus and the central control and recording station.

According to the embodiment of FIG. 6, the device firstly comprises a first coding assembly 2 in each box Bi. This assembly 2 comprises a coding element 3 adapted for forming digital words constituted by adding a suffix SCi of n bits c1, c2 ... cn to each one of the digitized N1-bit samples successively extracted from memory MO and for transferring the digital words thereafter into a storage unit 4 where they are grouped together in blocks of N2 words. By way of example, if the synchronizing words and the digitized samples have 24 bits each, a 5-bit coding suffix is selected and the digital words of 29 bits constituted thereby are grouped into blocks of 16 words for example. In the table of FIG. 4 showing this coding element 3, the successive digital words Wi (bi1, bi2 ... bN1i, c1i ... cni) are lined up and the bits b11, b12, ... b1i ... b1N2 thereof of equal weight are arranged in files.

Figure 5:
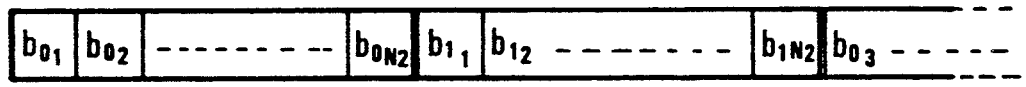
FIG. 5 shows the order of succession of the bits obtained by an interleaved reading of the storage means.

The device comprises an element 5 for the sequential reading by interleaving, adapted for controlling the extraction of the digital words from storage unit 4, in order to read in sequence all the bits of equal weight out of the total digital words of the same block, before extracting in sequence all the bits from the next file. A series of bits such as the one in FIG. 5, which is transmitted to a second coding assembly 6 applying a transmission coding, is constituted thereby. The coded words stemming from the second coding assembly 6 are applied to a transmitter 7 adapted to the transmission channel used. It may be a hertzian wave transmitter for example.

In the central station P, the signals arriving through the chosen transmission channel and possibly affected during the transmission (by an interference NS for example) are received by a receiver 8 adapted for restoring the series of (N1+n)* N2 bits of each transmitted block. A decoding assembly 9 of the same type as coding assembly 6 restores the series of bits by removing the particular transmission coding used. The series of bits are thereafter transmitted to a storage unit 10. An element 11 for managing storage unit 10 is adapted at first for checking the arranging of the series of bits received in the storage unit. This management element 11 thereafter checks the reading of memory 10 with reverse interleaving, in order to restore each one of the initial N2 digital words of (N1+n) bits, before transferring them into a decoding unit 12 adapted for comparing each N1-bit signal sample b0i, b1i, ... bN1i with the suffix Ci1 ... Cin thereof in order to detect and correct transmission errors. The suffix is then removed and the N1-bit digitized samples are stored in a storage unit 13.

According to a preferred embodiment lay-out, a coding mode that will reduce the pass-band usually required for the transmission of digitized data, such as a coding of the TFM type, is used. According to this mode, the transmission of each one of the bits bi of a stream of bits to be transmitted is achieved by applying to the phase of a carrier signal a phase variation:

$$d\Phi_i = \frac{\pi}{4}(1/2B_{i-1} + B_i + 1/2B_{i+1})$$

where $B_i = -1$ if $b_i = 0$, $B_i = +1$ if $b_i = 1$ and $B_{i-1}$ and $B_{i+1}$ are the corresponding values assigned to the bits $b_{i-1}$ and $b_i$ adjacent to bit $b_i$ in the stream of bits to be transmitted.

The device comprises in this case specific means for achieving this type of coded transmission and for facilitating the locating of the data received at the central station. These specific means comprise first of all a memory MO (FIG. 6) with addresses reserved for a defined number m of synchronizing words of N1 bits each, and organized in such a way that any series of digital words to be transmitted is extracted from the memory, preceded by the m synchronizing words of well-defined structure. The specific means are included in the second coding assembly 6 and in decoding assembly 9.

The coding assembly 6 comprises means for preceding the stream of bits read with interleaving from in memory 4 by two successive preambles. The first preamble consists of a fixed number p of digital words of (N1+n) bits each. Each one of these p words comprises an alternate sequence 0101 ... of logical 0 and 1 which, according to the TFM symbolization mentioned above, is translated into a zero phase variation. During this preamble, the transmitted signal is the carrier signal without modulation. During the time of transmission of the first preamble, the receiver 8 which receives the carrier signal without modulation can therefore come into phase therewith.

The second added preamble is a sequence consisting of a fixed number q of digital words of also (N1+n) bits each. Each one of them comprises an alternate double sequence of the 00110011 ... type. According to the TFM symbolization, the phase variation $d\Phi_i$ resulting from this second sequence is alternately $-\pi/4$ and $+\pi/4$.

Figure 7:
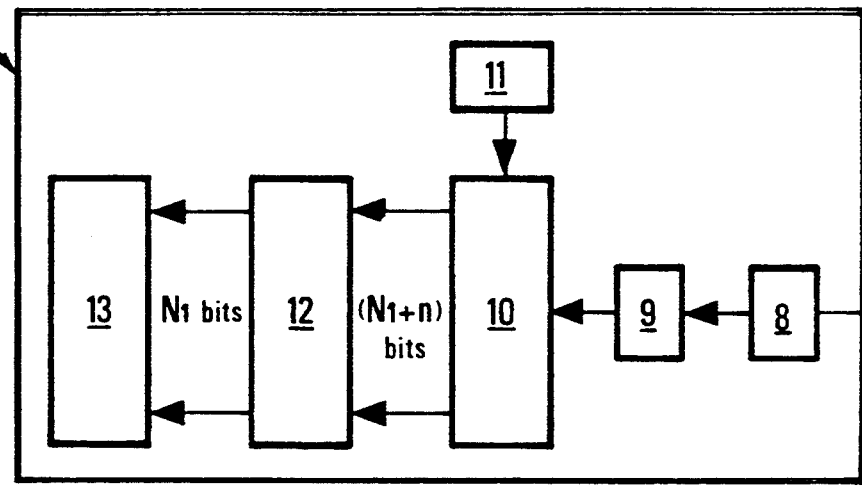
FIG. 7 is a more detailed view of a decoding assembly in the central station.
Figure 7:
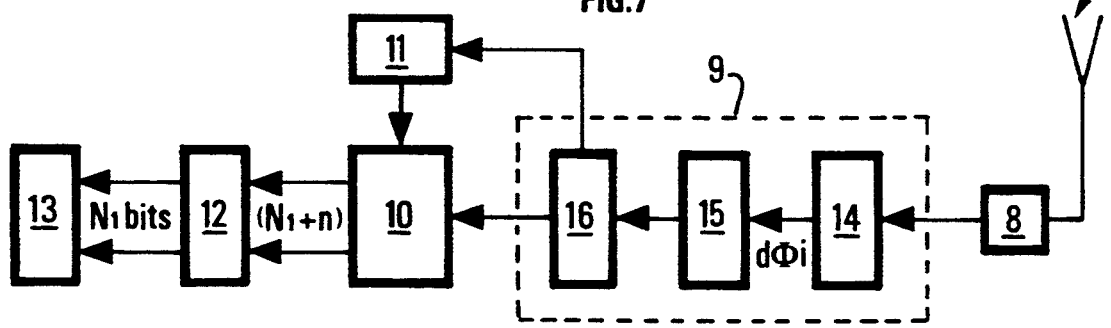

The corresponding decoding assembly 9 in the central station comprises (FIG. 7) a detector 14 for detecting the successive phase deviations $d\Phi_i$. The initial adjusting or taring of detector 14 is performed during the reception of the second coded preamble in the form of phase deviations known with great precision, alternately $+\pi/4$ and $-\pi/4$. The successive phase deviations measured by detector 14 are applied to a decoder 15, known as a state machine, to adjust the proper calibration thereof. This decoder 15 restores from the received symbols the stream of bits emitted with interleaving and loads memory 10. A correlation element 16 is interposed between decoder 15 and memory 10. It compares all the time the stream of bits received from the state machine 15 with an expected bit configuration corresponding to the interleaved synchronizing words and, as it detects this correspondence, it transmits a detection signal S which is used for piloting element 11 combined with memory 10 and managing the reading with reverse interleaving of the words arranged in the memory 10 also by using any other carrier signal (optical signal for example) or any physical support such as transmission lines.

Selecting any other well-known coding mode such as NRZ or HDB3 with one or several levels for transmitting the seismic data to a central station and possibly making it possible to reduce the pass-band that is generally necessary in seismic transmission systems can be done without departing from the scope of the invention.

The coding method and device which have been described make it possible in practice to detect and correct practically all the transmission errors which are likely to occur. It follows that practically faultless seismic traces can be restored.

In the embodiment described, data transfers are directly achieved between the acquisition apparatuses and the central station. Applying the described coding mode to a system where one or several relay elements could be interposed for relaying the transmissions coming from the different acquisition boxes, as described in the above cited U.S. Pat. No. 4,979,152 and 4,815,044, could also be done without departing from the scope of the invention.

We claim:

1. A method of obtaining seismic records of a subterranean zone with a low error rate, utilizing an acquisition apparatus and a central control unit, said method comprising the steps of:
   (a) collecting at the acquisition apparatus a series of seismic signals resulting from passage of a transmitted seismic signal through the subterranean zone;
   (b) storing the received series of seismic signals at the acquisition apparatus, together with synchronizing words, to provide digitized samples having N1 bits each;
   (c) encoding the stored digitalize samples at the acquisition apparatus by adding to the N1 bits of each digitalize sample a group of n check bits to form a set of encoded digital words;
   (d) sequentially storing the encoded digital words at the acquisition apparatus in successive blocks of N2 stored digital words;
   (e) successively reading the stored digital words at the acquisition apparatus by interleaving the blocks of stored digital words to provide (N1+n) digital words of N2 bits each;
   (f) adding to the (N1+n) digital words synchronizing data, including preample data made up of sequences of bits likely to introduce known phase or frequency shifts during transmission;
   (g) encoding the (N1+n) digital words from step (f) into digital symbols at the acquisition apparatus by combining the digital words, with weighting of successive bits of the digital words according to a TFM code;
   (h) transmitting successive digital symbols from the acquisition apparatus to the central control unit by modulating a carrier signal successively in accordance with the preamble data to provide known phase or frequency shifts to the carried signal, and in accordance with the digital symbols;
   (i) receiving the transmitted digital symbols at the central control unit;
   (j) phase or frequency detecting the received digital symbols by reversing the known phase or frequency shifts;
   (k) decoding the detected digital symbols at the central control unit to restore the interleaved blocks of (N1+n) digital words of N2 bits each;
   (l) storing the restored interleaved blocks;
   (m) reconstituting the blocks of N2 digital words of (N1+n) bits each at the central control unit, by reverse interleaving the digital words stored in step (l);
   (n) decoding the n check bits of the digital words in the reconstituted blocks at the central control unit, to correct any errors in the digital words and to suppress the n check bits of each digital word in the reconstituted blocks at the central control unit, thereby providing received digital samples.

2. A method as claimed in claim 1, wherein n is 5 and N1 is 24.

3. A method as claimed in claim 2, wherein N2 is 16.

4. A method as claimed in claim 1, wherein N2 is 16.

5. A method as claimed in claim 1, wherein step (h) comprises transmitting the successive digital symbols by radio transmission, and step (i) comprises receiving the transmitted digital symbols the radio transmission.

6. A system for obtaining seismic records of a subterranean zone with a low error rate, comprising:
   a seismic assembly unit including:
      (a) a receiver for receiving a series of seismic signals resulting from passage of a seismic signal through the subterranean zone;
      (b) a first memory for storing the received seismic signals, together with synchronizing digital words, to provide digitized samples of N1 bits each;
      (c) a first coding apparatus for encoding the stored digitalize samples by adding to the N1 bits of each digitalize sample a group of n check bits to form a set of encoded digital words;
      (d) a second memory for sequentially storing the encoded digital words in successive blocks of N2 stored digital words;
      (e) a first controller for successively reading the stored digital words from the second memory by interleaving the blocks of stored digital words to provide (N1+n) digital words of N2 bits each;
      (f) a second coding apparatus for adding to the (N1+n) digital words synchronizing data, including preamble data made up of sequences of bits likely to introduce known phase or frequency shifts during transmission, and for encoding the resulting (N1+n) digital words into digital symbols by combining the digital words, with weighting of successive bits of the (N1+n) digital words according to a TFM code; and
      (g) a transmitter for transmitting successive digital symbols, said transmitter including a carrier signal source and means for modulating the carrier signal successively in accordance with the preamble data to introduce known phase or frequency shifts to the carrier signal, and in accordance with the digital symbols; and
   a central control unit including:
      (h) a receiver for receiving the transmitted digital symbols;
      (i) a detector for phase or frequency detecting the received digital symbols by reversing the known phase or frequency shifts;
      (j) a first decoder for decoding the detected digital symbols to restore the interleaved blocks of (N1+n) digital words of N2 bits each;
      (k) a third memory for storing the restored interleaved blocks;
      (l) a second controller for reconstituting the blocks of N2 digital words of (N1+n) bits each by reverse interleaving the stored digital words from the third memory;

(m) a second decoder for decoding the n check bits of the digital words in the reconstituted blocks to correct any errors in the digital words and to suppress the n check bits of each digital word in the reconstituted blocks, thereby providing received digital samples.

7. A system as claimed in claim 6, wherein said transmitter is a radio transmitter and said receiver is a radio receiver.

* * * * *